Jan. 22, 1924.

M. G. HALVERSON
LAWN TRIMMER
Filed Jan. 20, 1922

1,481,465

INVENTOR.
Miner G. Halverson.
BY
Morsell + Keeney.
ATTORNEYS.

Patented Jan. 22, 1924.

1,481,465

UNITED STATES PATENT OFFICE.

MINER G. HALVERSON, OF WHITEWATER, WISCONSIN.

LAWN TRIMMER.

Application filed January 20, 1922. Serial No. 530,610.

*To all whom it may concern:*

Be it known that I, MINER G. HALVERSON, a citizen of the United States, and resident of Whitewater, in the county of Walworth and State of Wisconsin have invented new and useful Improvements in Lawn Trimmers, of which the following is a description, reference being had to the accompanying drawings, which are a part of this specification.

This invention relates to a lawn trimmer and more particularly to a tool designed for cutting away the sod adjacent the edges of walks, drives or the like.

Where lawns border on walks or driveways it is necessary to frequently cut away the sod which constantly encroaches onto the walk or drive-way in order to present a clean-cut and ornate appearance of the same. Considerable difficulty is ofttimes experienced in thus trimming lawns as it is necessary that it be accomplished with uniformity.

Therefore it is the object of this invention to provide a tool particularly adapted for the purpose and so constructed that the sod adjacent the walk or drive-way may be quickly and easily cut away without the exercise of skill on the part of the gardener.

To this end the invention consists essentially of a handle formed with a shank to which is secured the trimming member. This trimming member has an angular guiding portion adapted to rest on the edge of the walk or drive way, a cutting portion, the cutting edge of which is angularly disposed and a substantially vertical section connecting the guiding and cutting portions.

The rigidity and strength of the tool is assured by extending the handle shank entirely across the connecting section of the trimming member thereby positively reinforcing the same.

The details of construction as well as the manner of using the invention will be made more apparent in the accompanying specifications and drawings, in which.

Figure 1:
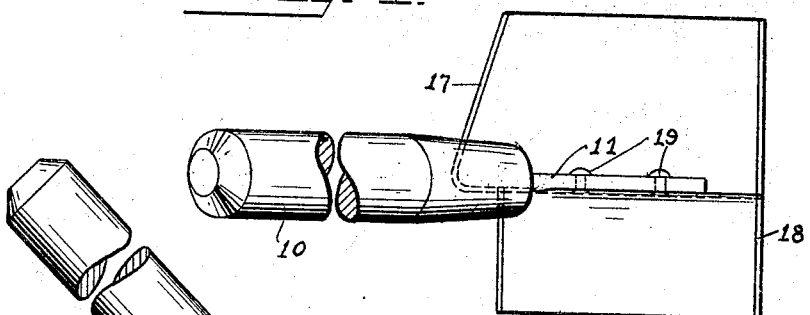
Figure 1 is a top plan view of this improved tool.
Figure 2:
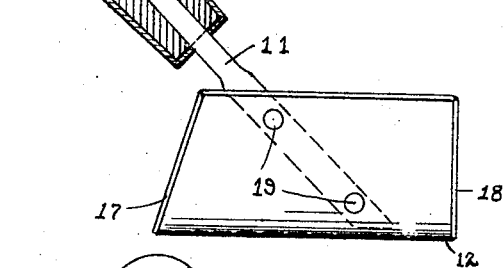
Fig. 2 is a side elevation thereof.

In the drawings wherein like numerals refer to like parts the numeral 10 indicates a handle and 11 a shank extending therefrom.

The cutting or trimming member 12 is in the form of an angular plate bent to provide a guiding portion 13 disposed preferably horizontally, a cutting portion 14 and an intermediate portion 15. The intermediate portion 15 is disposed approximately at right angles to the horizontal portion 13 and assists in guiding the tool when in use, the portions 13 and 15 abutting the top and side respectively of the walk or driveway 16.

The cutting portion 14 of the trimming member is disposed preferably at an acute angle to the portion 15 and is formed with an angular sharpened cutting edge 17. The opposite edge of the cutting portion is also sharpened as indicated at 18.

The handle 10 is connected to the trimming member at an oblique angle through the intermediary of the shank 11. In this connection the shank 11 extends entirely across the intermediate portion 15 to a point adjacent the cutting portion and is fastened to the trimming member by rivets or the like 19.

Figure 3:
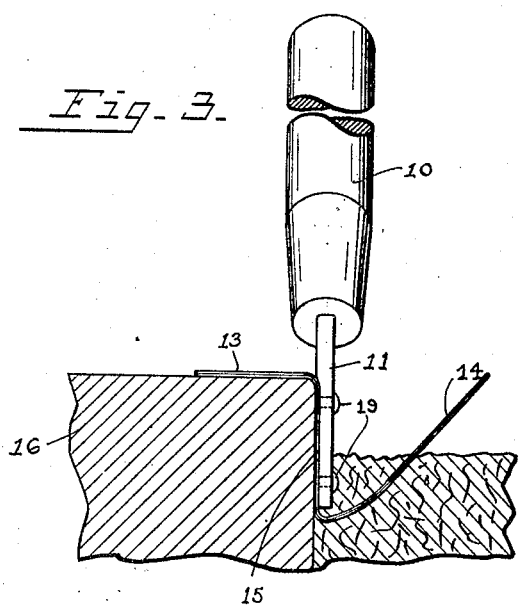
Fig. 3 is an end view of the tool, the same being shown in use.

In using the tool the cutting portion 14 of the trimming member is forced into the sod immediately adjacent the walk or drive-way with the portions 13 and 15 thereof engaging the walk or drive-way 16 as shown clearly in Fig. 3. The portion 13 limits the depth of the cut to be made while the vertical portion 15 regulates the width of the cut. The tool is then drawn toward the user in the direction of the angularly disposed cutting edge 17. The angular disposition of this cutting edge enables a shearing cut to be made which greatly facilitates the trimming operation. If desired the tool may be pushed away from the user, the cutting edge 18 then functioning.

The stresses upon the trimming member during the cutting operation in either direction are equally distributed and the whole trimming member is completely reinforced by the shank 11, which as hereinbefore stated extends angularly across the intermediate portion 15 and is rigidly fastened thereto.

Having described this invention, what is claimed is:

In a lawn trimming tool a handle, a shank projecting therefrom and a trimming member formed in one piece rigidly secured to said shank, said trimming member being formed with a substantially horizontal guiding portion, an angularly disposed cutting portion and an intermediate portion disposed substantially at right angles to said guiding portion, said cutting portion being provided with forward and rear sharpened cutting edges, the rear one of said edges being angularly disposed to permit a draw cut, said shank extending obliquely across the entire width of said intermediate portion for reinforcing said trimming member.

In testimony whereof, I affix my signature.

MINER G. HALVERSON.